(12) United States Patent
Motoi

(10) Patent No.: US 11,365,868 B2
(45) Date of Patent: Jun. 21, 2022

(54) ILLUMINATION DEVICE

(71) Applicant: ALPS ALPINE CO., LTD., Tokyo (JP)

(72) Inventor: Hiromi Motoi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/446,491

(22) Filed: Aug. 31, 2021

(65) Prior Publication Data
US 2021/0388971 A1 Dec. 16, 2021

Related U.S. Application Data

(63) Continuation of application No. PCT/JP2020/008946, filed on Mar. 3, 2020.

(30) Foreign Application Priority Data

Mar. 22, 2019 (JP) .............................. JP2019-055392

(51) Int. Cl.
*F21V 15/01* (2006.01)
*F21V 8/00* (2006.01)
(Continued)

(52) U.S. Cl.
CPC ............ *F21V 15/01* (2013.01); *G02B 6/0008* (2013.01); *B60Q 3/20* (2017.02); *B60Q 3/62* (2017.02); *B60Q 3/70* (2017.02)

(58) Field of Classification Search
CPC ..... F21V 15/01; G02B 6/0008; G02B 6/0006; B60Q 3/20; B60Q 3/62; B60Q 3/70; B60Q 1/0011; B60Q 1/0076; G09F 13/18; H01H 9/18; F21S 41/24; F21S 43/235; F21S 43/241; F21S 43/247

See application file for complete search history.

(56) References Cited

U.S. PATENT DOCUMENTS 9,304,250 B2 * 4/2016 Hori ....................... H01H 13/83
2004/0174716 A1 * 9/2004 Verdes ................ G02B 6/0006
362/555

FOREIGN PATENT DOCUMENTS

| FR | 2874992 | * 3/2006 | ............... B60Q 1/26 |
| JP | 2007-308102 | 11/2007 | |
| JP | 2018-195381 | 12/2018 | |

OTHER PUBLICATIONS

International Search Report for PCT/JP2020/008946 dated May 26, 2020.

* cited by examiner

*Primary Examiner* — Peggy A Neils
(74) *Attorney, Agent, or Firm* — IPUSA, PLLC

(57) ABSTRACT

An illumination device includes a housing, having an opening, a substrate, a light source, and a light guide. The opening extends through the housing from a first side to a second side of the housing, and includes a first space and a second space. The light guide is disposed across the first space and the second space. The housing has a wall surface that faces the second space and contacts the light guide, a guide rib that extends in a second direction, and a fitting wall that extends in a third direction. The light guide has a first contact surface that contacts the wall surface so as to position the light guide in a first direction, and a guide groove that is fitted to the guide rib so as to position the light guide in the third direction while guiding movement of the light guide in the second direction.

6 Claims, 12 Drawing Sheets

(51) Int. Cl.
*B60Q 3/62* (2017.01)
*B60Q 3/20* (2017.01)
*B60Q 3/70* (2017.01)

ILLUMINATION DEVICE

CROSS-REFERENCE TO RELATED APPLICATIONS

This application is a continuation of International Application No. PCT/JP2020/008946, filed on Mar. 3, 2020 and designating the U.S., which claims priority to Japanese Patent Application No. 2019-055392, filed on Mar. 22, 2019. The contents of these applications are incorporated herein by reference in their entirety.

BACKGROUND OF THE INVENTION

1. Field of the Invention

The disclosures herein relate to an illumination device, and more specifically relate to an attachment structure for attaching a light guide of the illumination device to a housing.

2. Description of the Related Art

In conventional switches installed in vehicles, a technology that can illuminate marks provided at operation positions from the back side is utilized. With regard to such a technology, Patent Document 1 below describes a technology that can guide light emitted from one light source to a plurality of switches through a light guide having branches.

However, with such a conventional technique, an assembly process for attaching a light guide to a housing may become complicated if the size of a space where the light guide is disposed is reduced or the size of a space required for assembly is reduced in order to reduce the size of the entire apparatus including a switch. In addition, the complicated assembly process may make it difficult to attach the light guide to a precise position in the housing.

RELATED-ART DOCUMENTS

Patent Documents

Patent Document 1: Japanese Laid-open Patent Publication No. 2007-308102

SUMMARY OF THE INVENTION

According to at least one embodiment, an illumination device includes a housing having an opening that extends through the housing from a first side to a second side of the housing; a substrate; a light source configured to emit light; and a light guide. The opening includes a first space and a second space. The first space is located closer to the first side and extends in a first direction, and the second space is located closer to the second side relative to the first space, is continuous from the first space, and extends in a second direction that is orthogonal to the first direction. The substrate is disposed closer to the second side relative to the second space. The light source is disposed on one surface of the substrate so as to face the second space. The light guide is disposed across the first space and the second space, and is configured to guide the light, emitted from the light source, to the opening. The housing has a wall surface that faces both the second side and the second space and contacts the light guide, a guide rib that extends in the second direction, and a fitting wall that extends in a third direction. The third direction is different from the first direction and the second direction. The light guide has a first contact surface that contacts the wall surface so as to position the light guide in the first direction, and a guide groove that is provided in the first contact surface and is fitted to the guide rib so as to position the light guide in the third direction while guiding movement of the light guide in the second direction.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
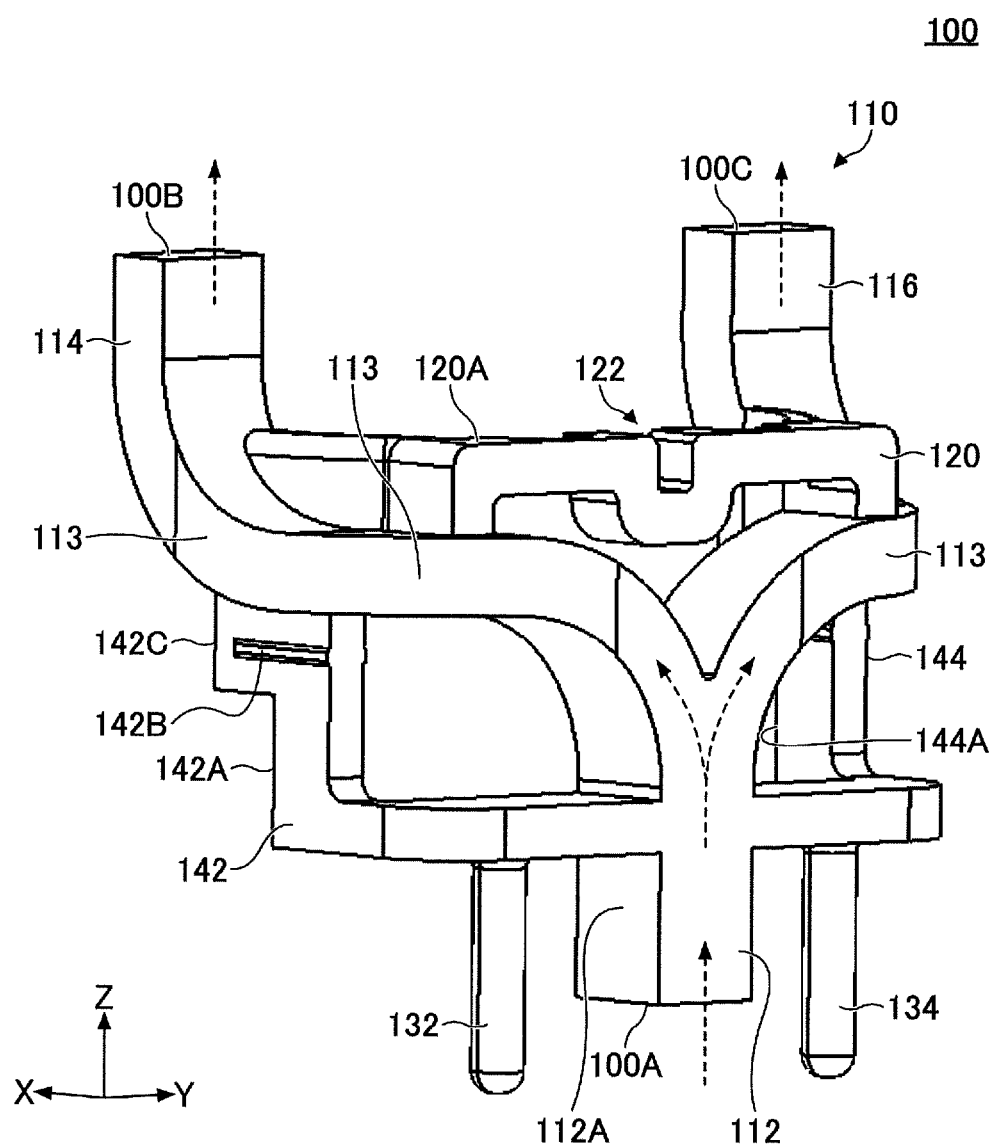
FIG. 1 is a perspective view of the exterior of a light guide according to an embodiment.

According to an embodiment of the present invention, an illumination device having a relatively simple configuration and capable of readily attaching a light guide to a precise location in a housing can be provided.

In the following, an embodiment of the present invention will be described with reference to FIG. 1 through FIG. 12. In the following description, the positive Z-axis side in the drawings is referred to as an upper side (an example of "a first side" recited in the claims), the negative Z-axis side in the drawings is referred to as a lower side (an example of a "second side" recited in the claims), the positive X-axis side in the drawings is referred to as a front side, the negative X-axis side in the drawings is referred to as a rear side, the positive Y-axis side in the drawings is referred to as a right side, and the negative Y-axis side in the drawings is referred to as a left side, for the sake of convenience. Further, the Z-axis direction in the drawings is an example of a "first direction" recited in the claims. The X-axis direction in the drawings is an example of a "second direction that is orthogonal to the first direction" recited in the claims. The Y-axis direction in the drawings is an example of a "third direction that is different from the first direction and the second direction" recited in the claims.

In the following embodiment, an example in which the present invention is applied to an illumination device 10 will be described. The illumination device 10 is installed, for example, in a vehicle such as an automobile, and is configured to supply light in order to illuminate illumination marks provided on an operation knob (not illustrated) of a vehicle switch (such as a power window switch), such that operation positions of the operation knob can be easily recognized. For this purpose, the illumination device 10 illuminates the operation knob from the back side with light. In the present embodiment, such an operation knob is provided over an opening 212 so as to cover the opening 212.

(Light Guide 100)

Figure 2:
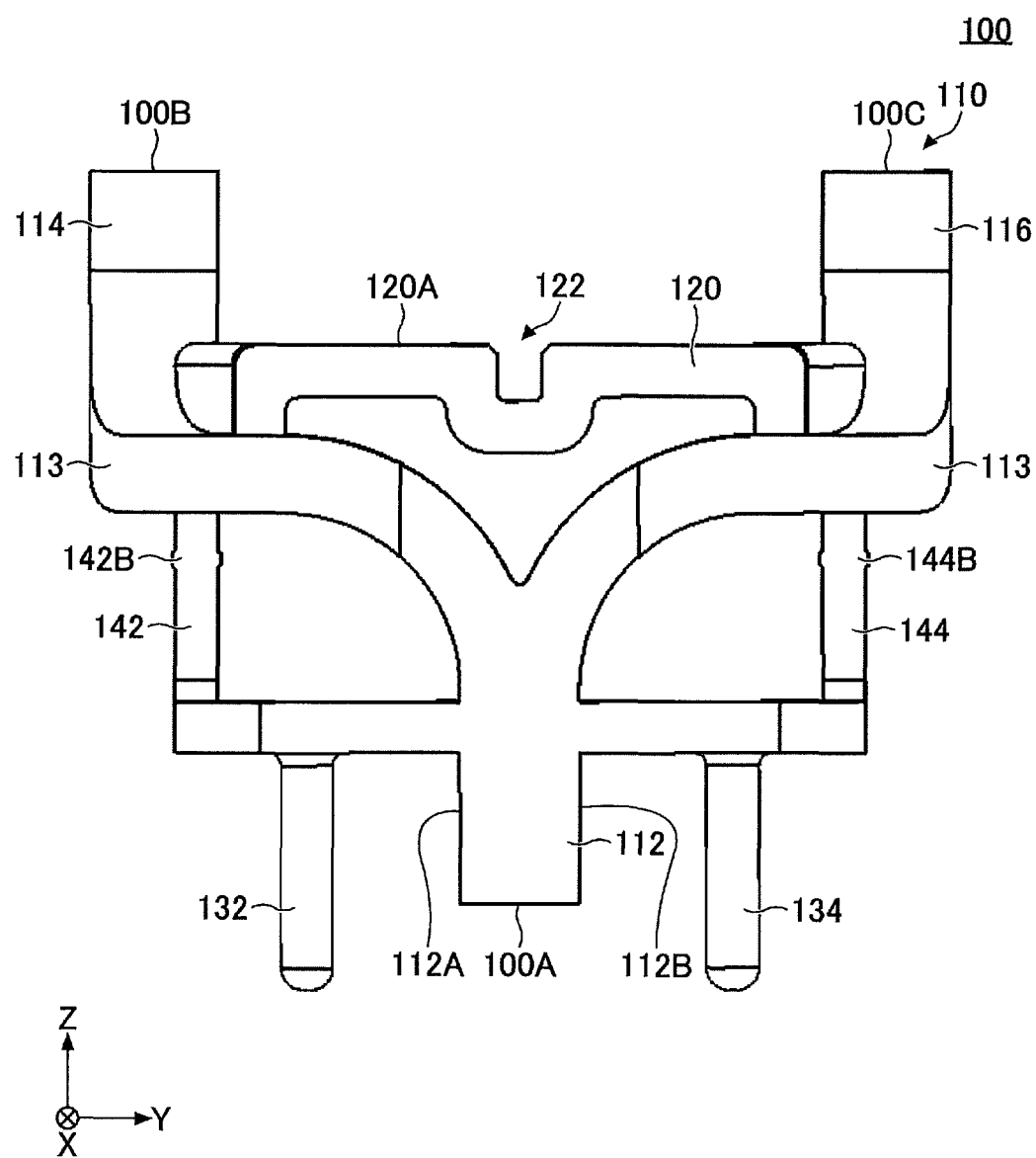
FIG. 2 is a rear view of the light guide according to the embodiment.
Figure 3:
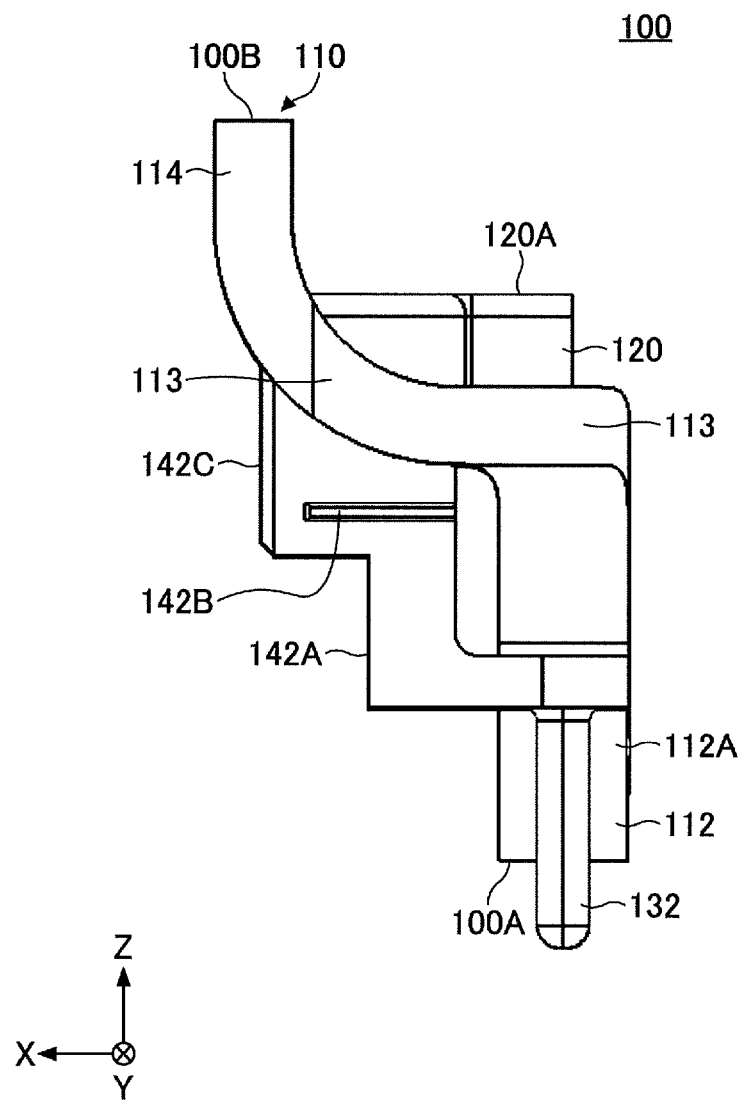
FIG. 3 is a left-side view of the light guide according to the embodiment.
Figure 4:
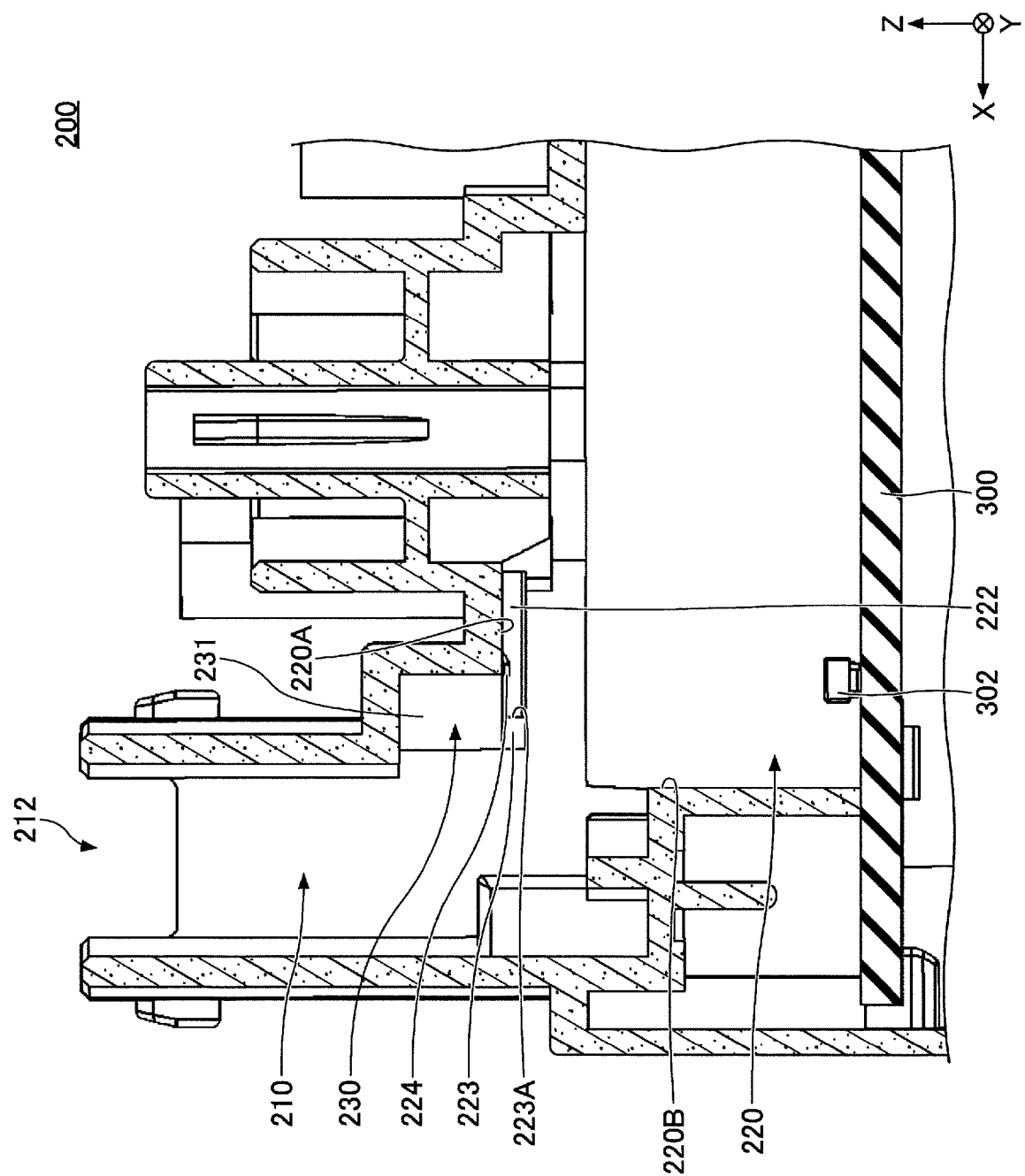
FIG. 4 is a cross-sectional view of a housing taken along the XZ plane according to the embodiment.
Figure 5:
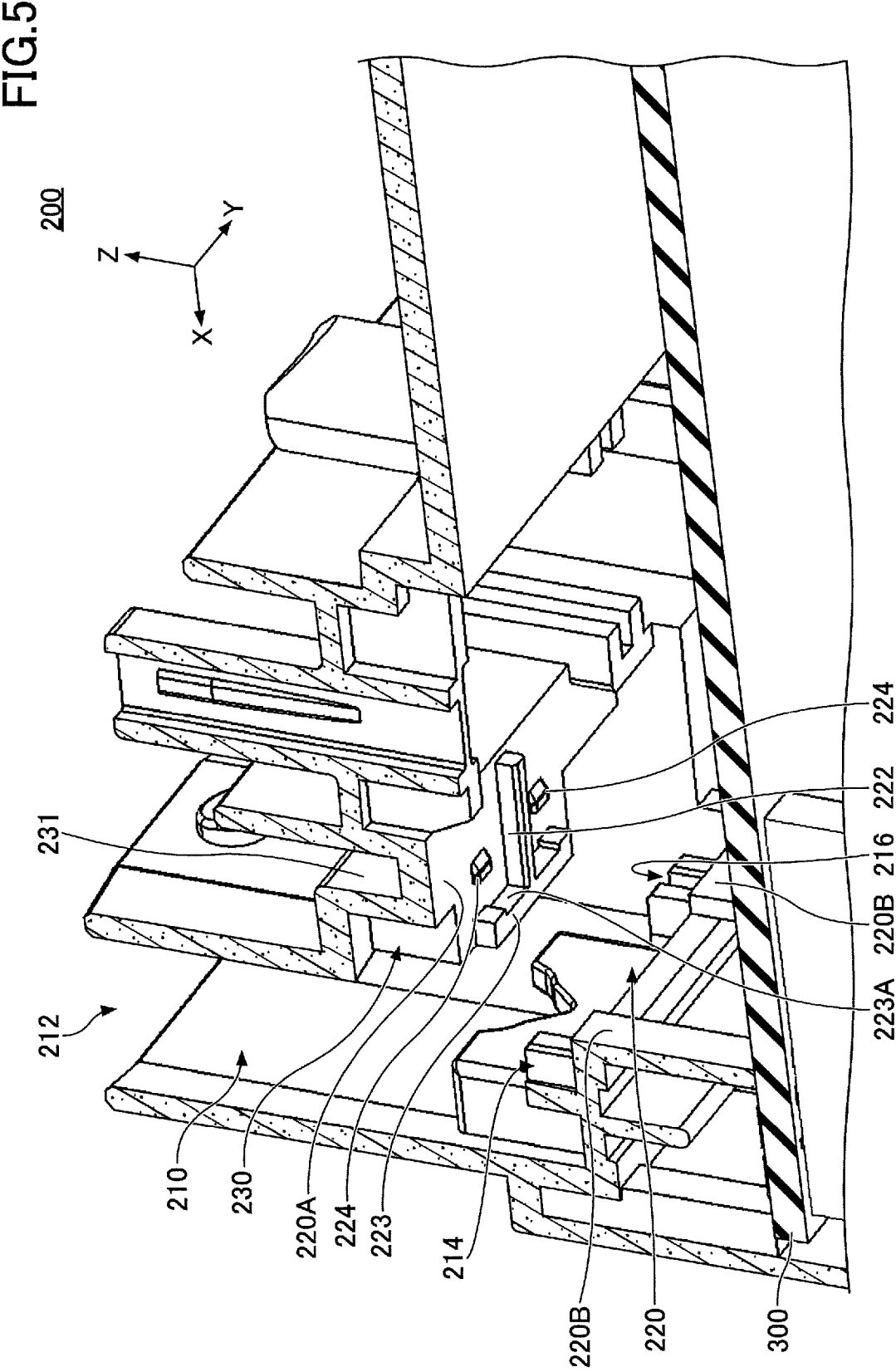
FIG. 5 is a perspective cross-sectional view of the housing taken along the XZ plane according to the embodiment.
Figure 6:
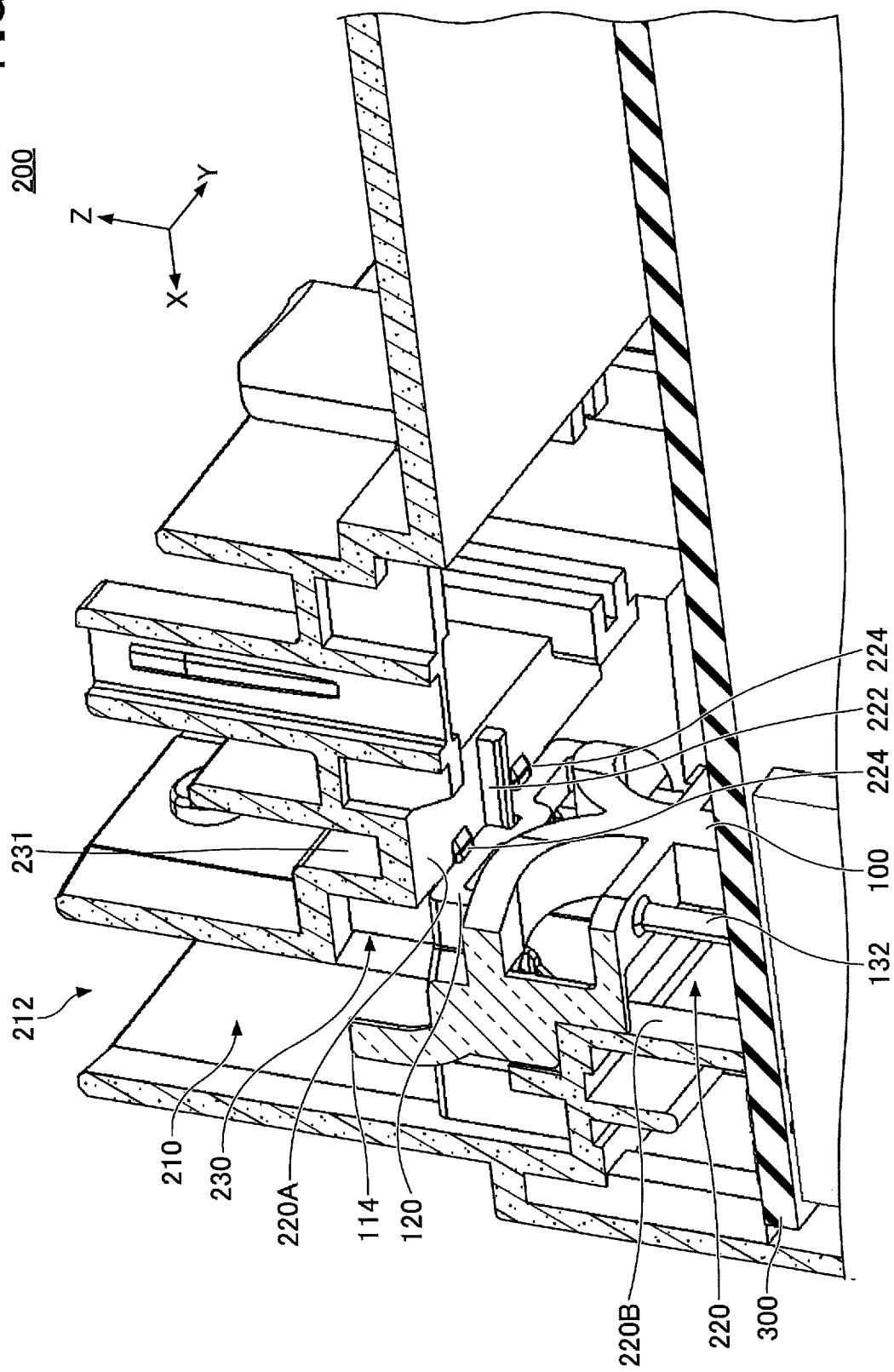
FIG. 6 is a perspective cross-sectional view of the housing taken along the XZ plan, to which the light guide is attached.
Figure 7:
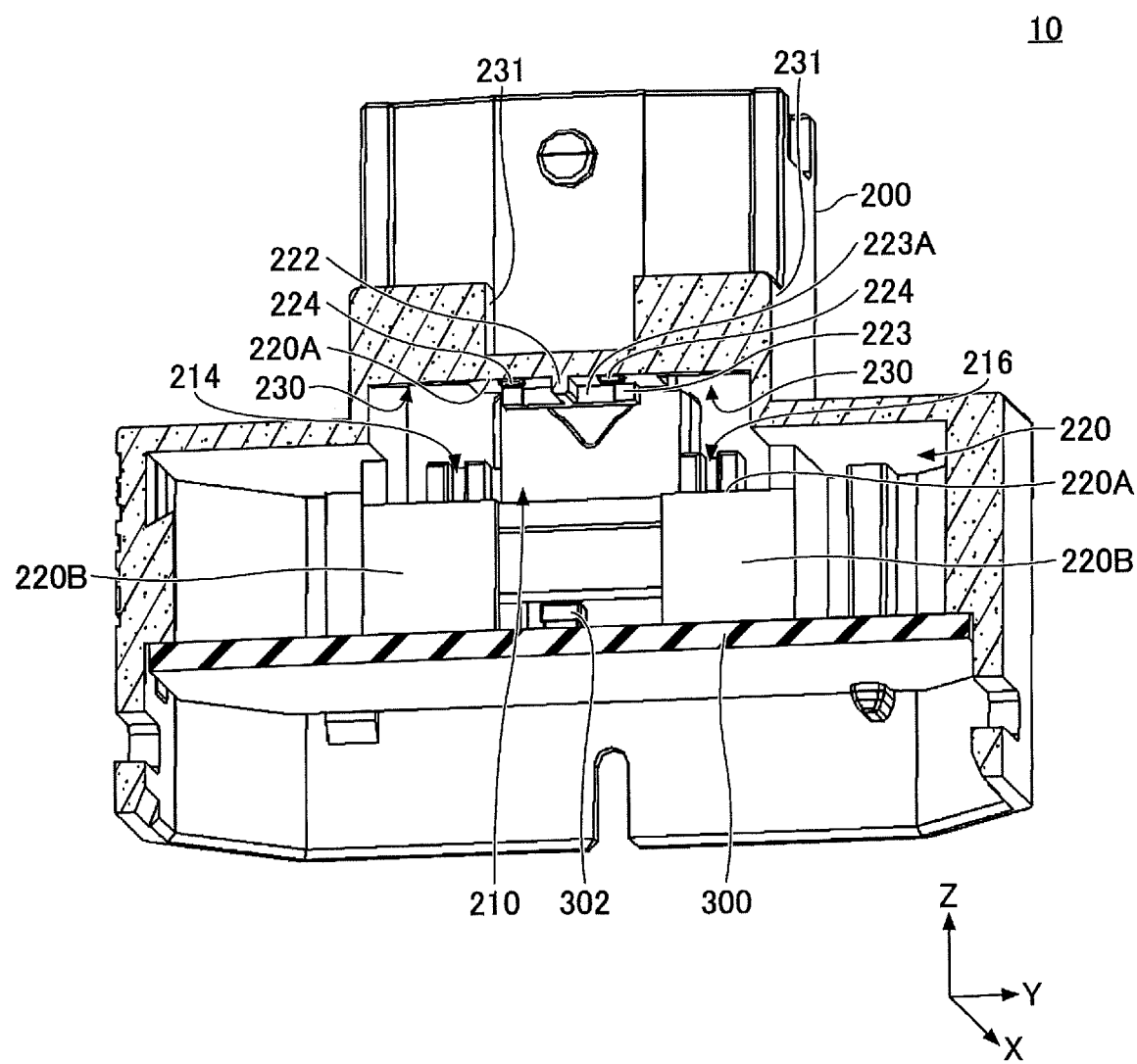
FIG. 7 is a perspective cross-sectional view of an illumination device taken along the YZ plan according to the embodiment.
Figure 8:
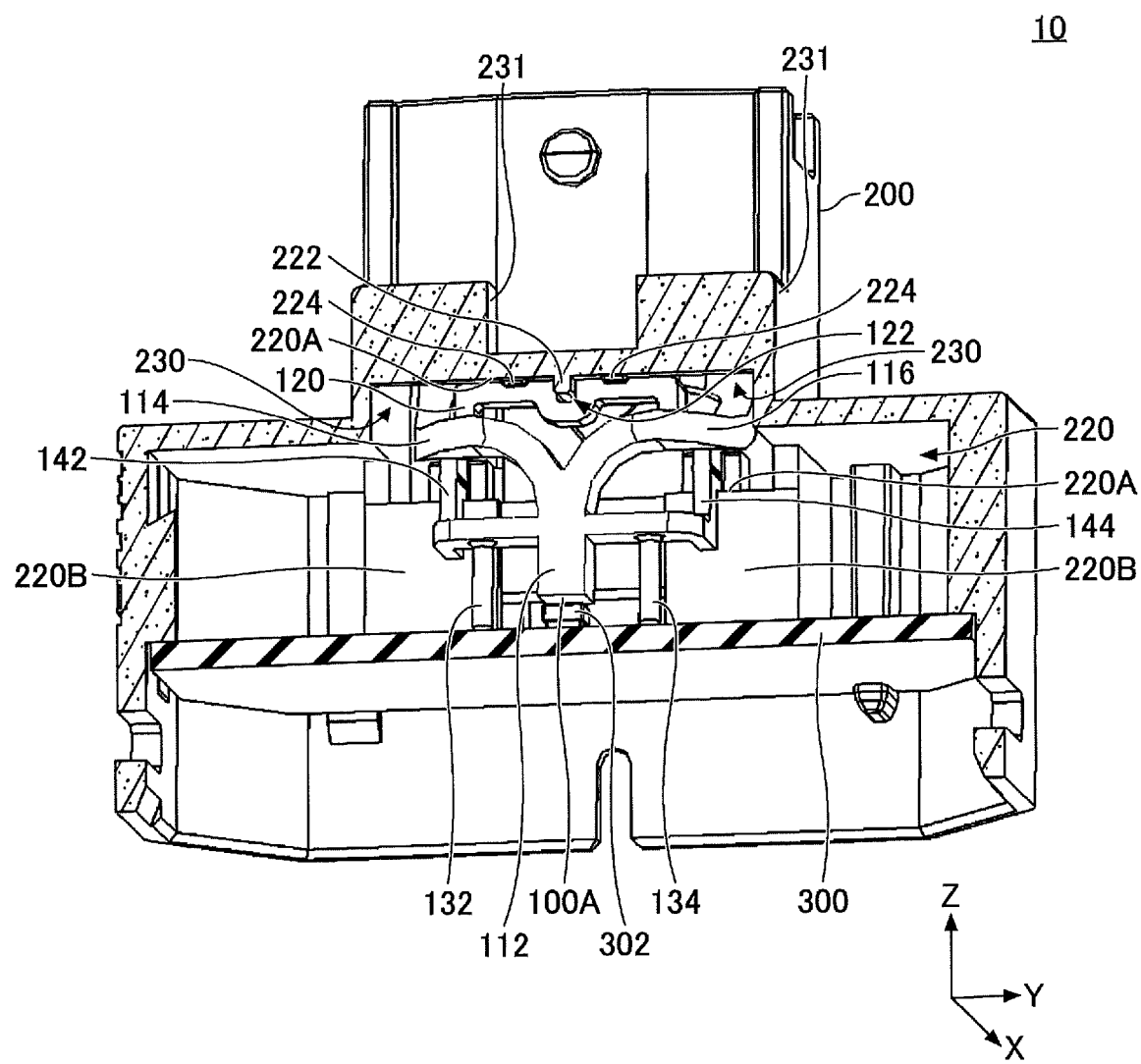
FIG. 8 is a perspective cross-sectional view of the illumination device taken along the YZ plan, in which the light guide is attached to the housing according to the embodiment.
Figure 9:
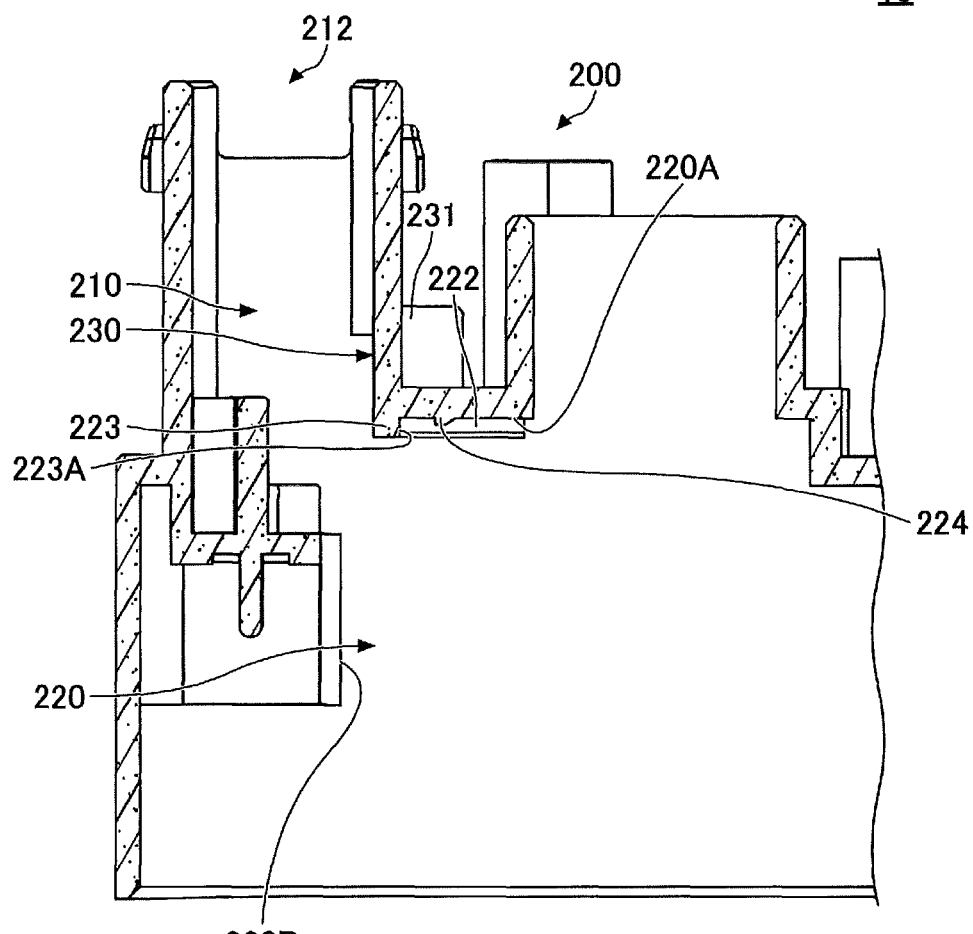
FIG. 9 is a diagram illustrating the initial state of the illumination device in which the light guide is to be attached according to the embodiment.
Figure 10:
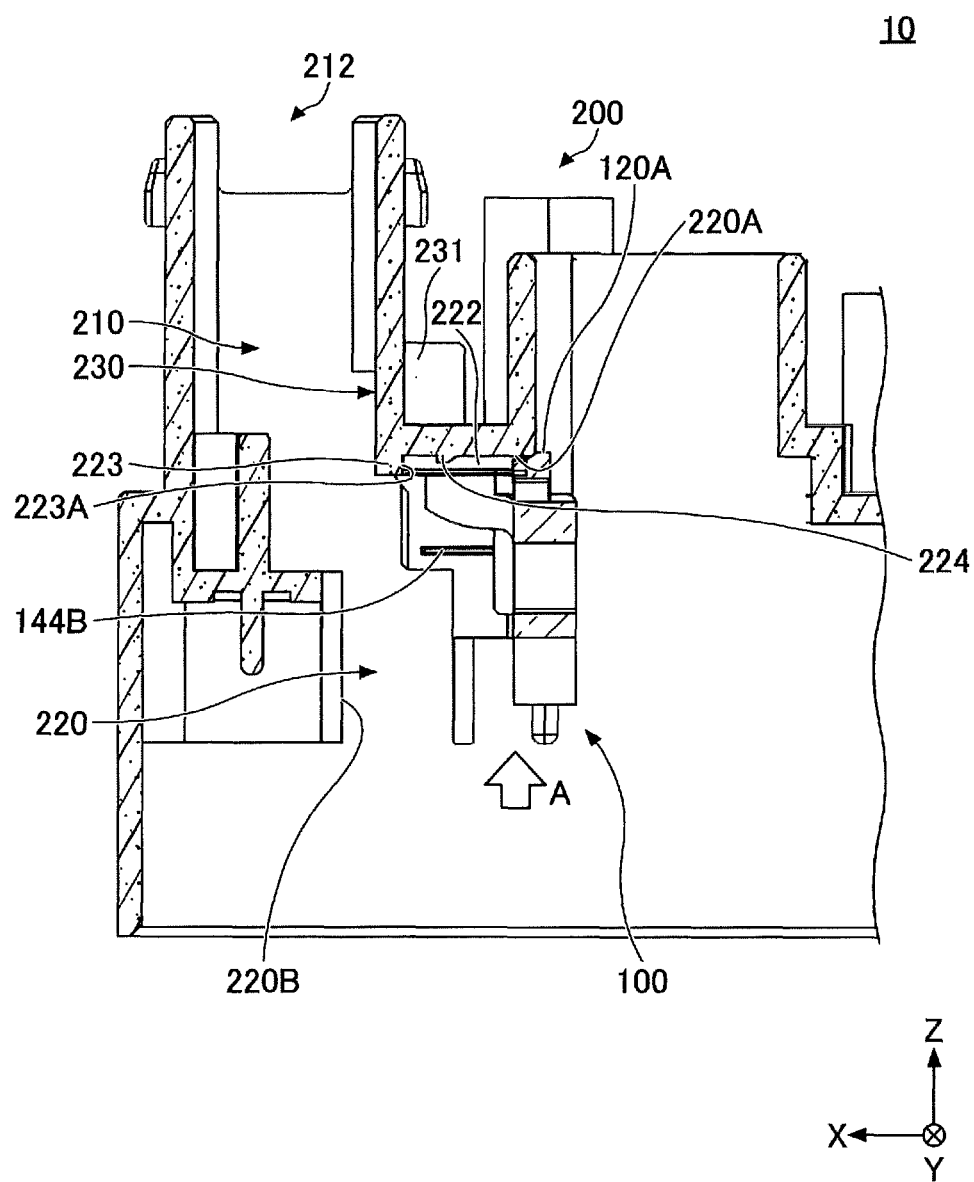
FIG. 10 is a diagram illustrating a process for positioning the light guide in the upper-lower direction in the illumination device according to the embodiment.
Figure 11:
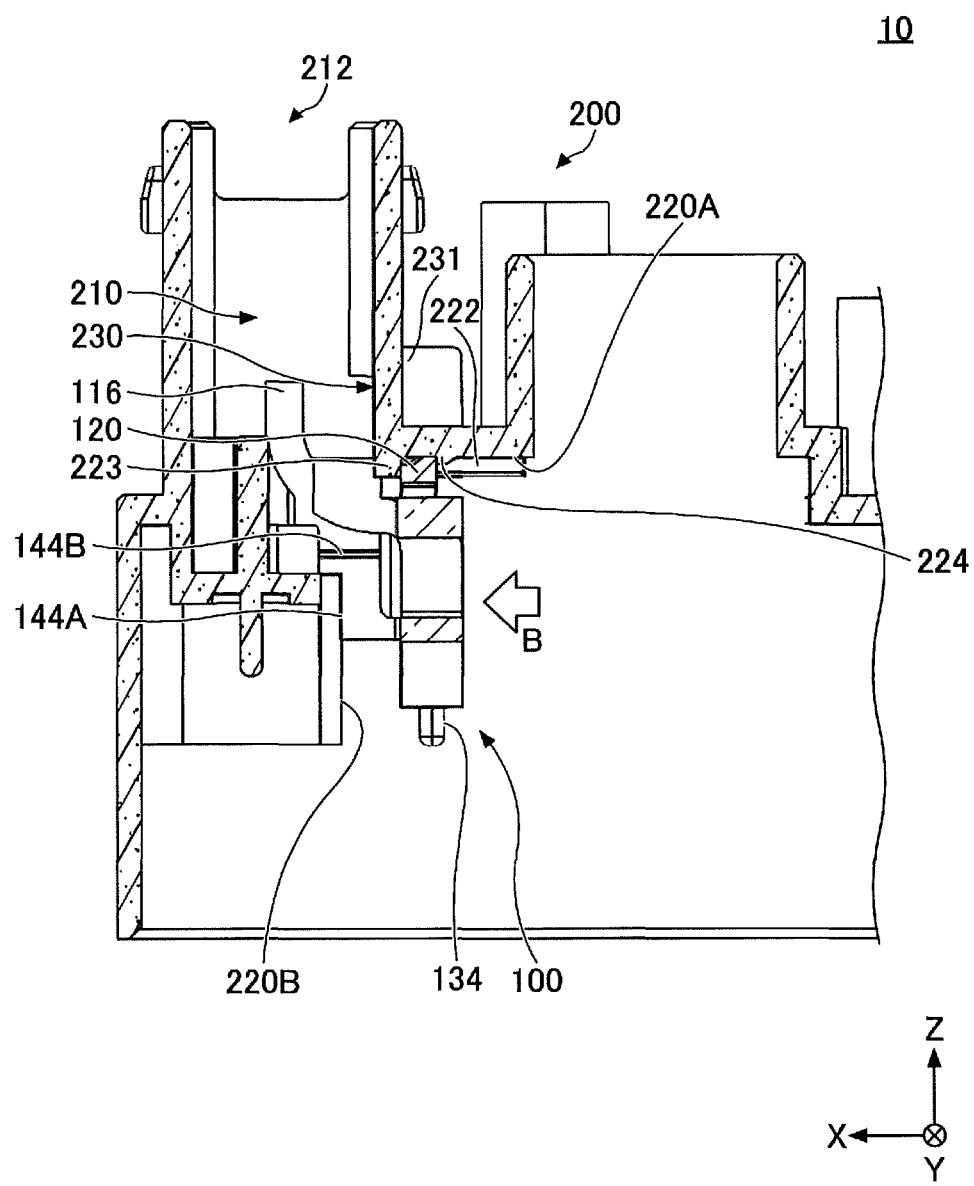
FIG. 11 is a diagram illustrating a process for positioning the light guide in the front-rear direction in the illumination device according to the embodiment.
Figure 12:
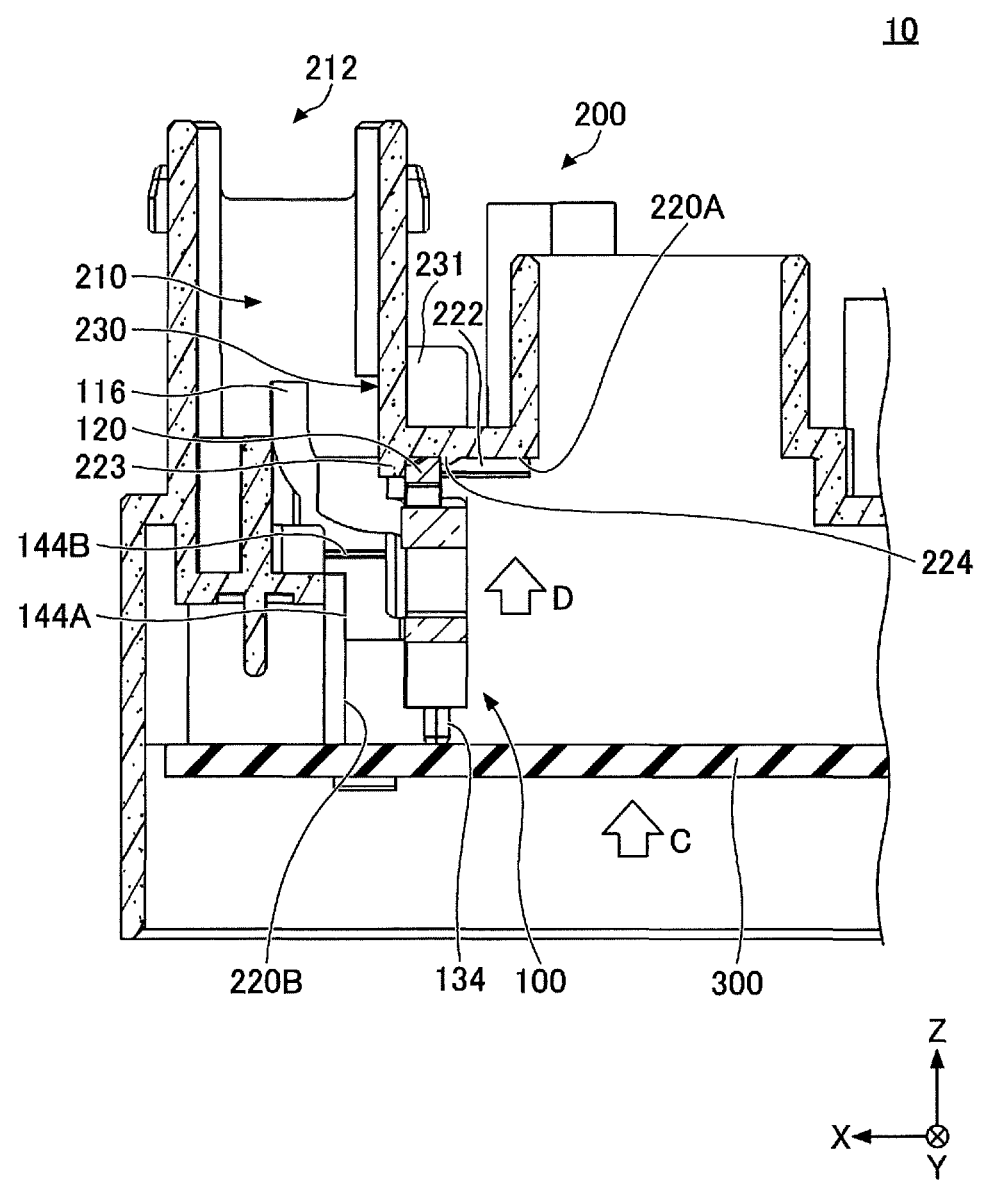
FIG. 12 is a diagram illustrating a process for attaching a substrate in the illumination device according to the embodiment.

FIG. 1 is a perspective view of the exterior of the light guide 100 according to an embodiment. FIG. 2 is a rear view of the light guide 100 according to the embodiment. FIG. 3 is a left-side view of the light guide 100 according to the embodiment. FIG. 4 is a cross-sectional view of a housing taken along the XZ plane according to the embodiment. FIG. 5 is a perspective cross-sectional view of the housing taken along the XZ plane according to the embodiment. FIG. 6 is a perspective cross-sectional view of the housing taken along the XZ plan, to which the light guide is attached. FIG. 7 is a perspective cross-sectional view of the illumination device taken along the YZ plan according to the embodiment. FIG. 8 is a perspective cross-sectional view of the illumination device taken along the YZ plan, in which the light guide is attached to the housing according to the embodiment. FIG. 9 is a diagram illustrating the initial state of the illumination device in which the light guide is to be attached according to the embodiment. FIG. 10 is a diagram illustrating a process for positioning the light guide in the upper-lower direction in the illumination device according to the embodiment. FIG. 11 is a diagram illustrating a process for positioning the light guide in the front-rear direction in the illumination device according to the embodiment. FIG. 12 is a diagram illustrating a process for attaching a substrate in the illumination device according to the embodiment.

The light guide 100 illustrated in FIG. 1 through FIG. 3 is a constituent element of the illumination device 10, and is provided within a housing 200 of the illumination device 10. The light guide 100 is an example of a "light guide" recited in the claims. As illustrated in FIG. 1 through FIG. 3, the light guide 100 has a general Y-shape with three branches in plan view from the rear side. The light guide 100 includes a guide portion 110 that guides light emitted from a light source. The light guide 100 further includes components (a coupling portion 120, a first leg portion 132, a second leg portion 134, a first reinforcing portion 142, and a second reinforcing portion 144) used for attachment in the illumination device 10.

The guide portion 110 includes a light guide path 112 that extends in the upper-lower direction (Z-axis direction in the drawings), and an incident surface 100A that is provided at the lower end of the light guide path 112 and receives light from a light-emitting diode (LED) 302 (see FIG. 8). The LED 302 is disposed under the light guide path 112. In the present embodiment, the light guide path 112 is formed at a center portion in the left-right direction (Y-axis direction in the drawings) of the guide portion 110, and is disposed at a center portion in the left-right direction (Y-axis direction in the drawings) of the illumination device 10. Further, the guide portion 110 includes a first branch path 114 that branches from the upper end of the light guide path 112 to the left (to the negative Y-axis side in the drawings), and a second branch path 116 that branches from the upper end of the light guide path 112 to the right (to the positive Y-axis side in the drawings).

The first branch path 114 is an example of a "first branch path" recited in the claims. The first branch path 114 is bent at an angle of 90 degrees from the upper end of the light guide path 112 to the left (to the negative Y-axis side in the drawings) while being curved, then bent forward (to the positive X-axis side in the drawings) at an angle of 90 degrees while being curved, and further bent upward (to the positive Z-axis side in the drawings) at an angle of 90 degrees while being curved.

The second branch path 116 is an example of a "second branch path" recited in the claims. The second branch path 116 is bent at an angle of 90 degrees from the upper end of the light guide path 112 to the right (to the positive Y-axis side in the drawings) while being curved, then bent forward (to the positive X-axis side in the drawings) at an angle of 90 degrees) while being curved, and further bent upward (to the positive Z-axis side in the drawings) at an angle of 90 degrees while being curved.

The upper end surface of the first branch path 114 serves as a first light emitting surface 100B that emits light from the LED 302 to the outside of the guide portion 110. The upper end surface of the second branch path 116 serves as a second light emitting surface 100C that emits light from the LED 302 to the outside of the guide portion 110.

The light guide 100 is formed of a material (such as an acrylic resin) capable of guiding light from the light incident surface 100A to the first light emitting surface 100B and to the second light emitting surface 100C by propagating the light through the light guide path 112, the first branch path 114, and the second branch path 116.

That is, the light guide 100 has a configuration in which light, emitted upward from the LED 302 (see FIG. 8) disposed under (the negative Z-axis side of) the light guide path 112, enters the lower end surface (light incident surface 100A) of the light guide path 112, and is guided through the light guide path 112, as indicated by dashed arrows in FIG. 1. Further, the light guide 100 has a configuration in which light is divided at the upper end of the light guide path 112 into the first branch path 114 and the second branch path 116, and is emitted upward (to the positive Z-axis side in the drawings) from each of the upper end surfaces (the first light emitting surface 100B and the second light emitting surface 100C) of the first branch path 114 and the second branch path 116.

Further, as illustrated in FIG. 1 through FIG. 3, the light guide 100 includes the coupling portion 120 (an example of a "coupling portion" recited in the claims). The coupling portion 120 is provided on the upper side (positive Z-axis side in the drawing) of the light guide 100, and couples the first branch path 114 to the second branch path 116. Specifically, the coupling portion 120 is provided on the upper side of the light guide 100, and couples the upper surface of a leftmost portion (a curved portion 113), extending from the branch position, of the first branch path 114, to the upper surface of a rightmost portion (a curved portion 113), extending from the branch position, of the second branch path 116.

A guide groove 122 (an example of a "guide groove" recited in the claims) is formed in a center portion in the left-right direction of a top surface 120A of the coupling portion 120. The guide groove 122 is fitted to a guide rib 222 that is formed on a wall surface 220A (an example of a "wall surface" recited in the claims), facing a second space 220 of the housing 200 as illustrated in FIG. 4 through FIG. 12, thereby positioning the light guide 100 with respect to the housing 200 in the left-right direction (Y-axis direction in the drawings) while guiding the movement of the light guide 100 in the front-rear direction (X-axis direction in the drawings). The top surface 120A of the coupling portion 120 is an example of a "first contact surface" recited in the claims. The top surface 120A of the coupling portion 120 contacts the wall surface 220A facing the second space 220 of the housing 200, thereby positioning the light guide 100 in the upper-lower direction.

In the present embodiment, as illustrated in FIG. 1 through FIG. 3, the first branch path 114 and the second branch path 116 have the respective curved portions 113 that are positioned higher than the branch position. The coupling portion 120 couples the upper surface of the curved portion 113 of the first branch path 114 to the upper surface of the curved portion 113 of the second branch path 116. More specifically, the coupling portion 120 couples the inner peripheral surface, corresponding to the upper surface, of the curved portion 113 of the first branch path 114 to the inner peripheral surface, corresponding to the upper surface, of the curved portion 113 of the second branch path 116. When light emitted from the LED 302 is guided through the inside of each of the curved portions 113, the light is mainly reflected by the outer peripheral surface side of each of the curved portions 113, and is concentrated on the outer peripheral surface side of each of the curved portions 113. Therefore, light emitted from the LED 302 is less likely to be reflected by the inner peripheral surface side of each of the curved portions 113, and thus, a low density of light is guided on the inner peripheral surface side of each of the curved portions 113. That is, in the first branch path 114 and the second branch path 116, the coupling portion 120 is coupled to portions having a low density of light. Therefore, the possibility that light may be guided from the curved portion 113 of each of the first branch path 114 and the second branch path 116 to the coupling portion 120 becomes small. With this configuration, when light is guided through the inside of the light guide 100, the amount of light leaking to the outside of the light guide 100 through the coupling portion 120 can be reduced.

Further, the light guide 100 includes the first reinforcing portion 142 and the second reinforcing portion 144. The first reinforcing portion 142 connects a left side surface 112A (an example of a "side surface on a first branch path side" recited in the claims) of the light guide path 112 to the lower surface of the first branch path 114, thereby reducing deformation of the first branch path 114. The second reinforcing portion 144 connects a right side surface 112B (an example of a "side surface on a second branch path side" recited in the claims) of the light guide path 112 to the lower surface of the second branch path 116, thereby reducing deformation of the second branch path 116.

The first reinforcing portion 142 has an end surface 142A (an example of a "third contact surface" recited in the claims) and an edge portion 142C on the front side thereof (on the positive X-axis side in the drawings). Further, the first reinforcing portion 142 has ribs 142B that protrude from the right side surface and the left side surface of the first reinforcing portion 142.

In the assembled state, the end surface 142A contacts a wall surface 220B (an example of a "positioning portion" recited in the claims) illustrated in FIG. 4 through FIG. 12, thereby positioning the light guide 100 with respect to the housing 200 in the front-rear direction (X-axis direction in the drawings).

In the assembled state, the edge portion 142C contacts the surface facing the rear side (negative X-side) of a groove portion 214, thereby positioning the light guide 100 with respect to the housing 200 in the front-rear direction (X-axis direction in the drawings).

In the assembled state, the most protruding points of the ribs 142B contact the surfaces facing the right side and the left side of the groove portion 214, thereby positioning the light guide 100 with respect to the housing 200 in the left-right direction (Y-axis direction in the drawings). The dimension between the most protruding points of the ribs 142B in the left-right direction is slightly larger than the dimension in the left-right direction of the groove portion 214.

The second reinforcing portion 144 has an end surface 144A (another example of a "third contact surface" recited in the claims) and an edge portion 144C on the front side thereof (on the positive X-axis side in the drawings). Further, the second reinforcing portion 144 has ribs 144B that protrude from the right side surface and the left side surface of the second reinforcing portion 144.

In the assembled state, the end surface 144A contacts a wall surface 220B, thereby positioning the light guide 100 with respect to the housing 200 in the front-rear direction (X-axis direction in the drawings).

In the assembled state, the edge portion 144C contacts the surface facing the rear side (negative X-side) of a groove portion 216, thereby positioning the light guide 100 with respect to the housing 200 in the front-rear direction (X-axis direction in the drawings).

In the assembled state, the most protruding points of the ribs 144B contact the surfaces facing the right side and the left side of the groove portion 216, thereby positioning the light guide 100 with respect to the housing 200 in the left-right direction (Y-axis direction in the drawings). The dimension between the most protruding points of the ribs 144B in the left-right direction is slightly larger than the dimension in the left-right direction of the groove portion 216.

Further, the light guide 100 includes the first leg portion 132 (an example of a "leg portion" recited in the claims) and the second leg portion 134 (another example of a "leg portion" recited in the claims). The first leg portion 132 is provided at the left side of the light guide path 112 and extends downward (in the negative Z-axis direction in the drawings) from the lower surface of the first reinforcing portion 142, and the second leg portion 134 is provided at the right side of the light guide path 112 and extends downward from the lower surface of the second reinforcing portion 144. The lower end portions of the first leg portion 132 and the second leg portion 134 are positioned lower than the lower end portion (that is, the light incident surface 100A) of the light guide path 112. Each of the first leg portion 132 and the second leg portion 134 receives an upward pressing force from the substrate 300 by making contact with the upper surface of the substrate 300. Accordingly, the top surface 120A of the coupling portion 120 is pressed against the wall surface 220A of the second space 220 of the housing 200, thereby positioning the light guide 100 in the upper-lower direction.

(Housing 200)

The housing 200 illustrated in FIG. 4 through FIG. 8 is a constituent element of the illumination device 10. The components (the light guide 100, the substrate 300, and the LED 302) are assembled into the housing 200. The housing 200 is an example of a "housing" recited in the claims. As illustrated in FIG. 4 through FIG. 12, the housing 200 has an opening 212 (an example of an "opening" recited in the claims) that extends through the housing from one side to the other side of the housing. The opening 212 includes a first space 210 and the second space 220. In addition, the housing 200 has a third space 230 that is formed continuously from the first space 210. The housing 200 further includes a wall portion 231 that defines the third space 230.

The first space 210 is an example of a "first space" recited in the claims. The first space 210 is a space through which light is emitted to the outside of the housing 200 (above the first space 210). Light emitted from the LED 302 to the second space 220 enters the first space 210 through the light guide 100. Then, the light is emitted from the first space 210 to the outside of the housing 200 (above the first space 210). For example, an operation knob of a vehicle switch is provided over the first space 210. With this configuration, the bottom side of the operation knob of the vehicle switch can be irradiated with light by the illumination device 10. In the present embodiment, the operation knob, a contact member, and the like are not illustrated in the drawings. The third space 230 is provided for temporarily accommodating parts (the branch paths 114 and 116) of the light guide 100, located above the coupling portion 120, during a process for positioning the light guide 100 in the upper-lower direction as illustrated in FIG. 10.

The second space 220 is an example of a "second space" recited in the claims. The second space 220 is a space to which light is emitted from the LED 302 provided on the substrate 300. As illustrated in FIG. 4 through FIG. 8, the flat plate-shaped substrate 300 (an example of a "substrate" recited in the claims) is provided under the second space 220 so as to close the lower side of the second space 220. Further, as illustrated in FIG. 4 and FIG. 8, the LED 302 (an example of a "light source" recited in the claims) is provided on the upper surface of the substrate 300 at a position corresponding to the light incident surface 100A of the light guide 100.

The second space 220 is formed on the lower side (negative Z-axis side in the drawings) relative to the first space 210, and is offset rearward from the first space 210. As used herein, "offset rearward" means that a front part on the front side of the second space 220 overlaps a rear part of the first space 210 in plan view from the top.

The second space 220 extends continuously from the first space 210. As illustrated in FIG. 6 and FIG. 8, in an area where the second space 220 extends continuously with the first space 210, the light guide 100 is disposed across the first space 210 and the second space 220. Specifically, in the assembled state, the branch paths 114 and 116 are located in the first space 210, the light guide path 112 is located in the second space 220, and the curved portions 113 are located at a boundary between the first space 210 and the second space 220. With this configuration, in the illumination device 10, light emitted from the LED 302 to the second space 220 can enter the first space 210 through the light guide 100, and can be emitted from the upper side of the first space 210 toward the bottom surface of the operation knob (not illustrated) provided over the opening 212 so as to cover the opening 212.

As illustrated in FIG. 4 through FIG. 8, the second space 220 has the flat-shaped wall surface 220A (an example of a "wall surface" recited in the claims). The wall surface 220A contacts the top surface 120A of the coupling portion 120 of the light guide 100, thereby allowing the light guide 100 to be accurately positioned in the upper-lower direction. The wall surface 220A is provided with the guide rib 222, a fitting wall 223, and fitting protrusions 224.

The guide rib 222 is an example of a "guide rib" recited in the claims. The guide rib 222 protrudes downward from the wall surface 220A, and extends in the front-rear direction (X-axis direction in the drawings). The guide rib 222 is fitted into the guide groove 122 of the coupling portion 120 of the light guide 100, thereby positioning the light guide 100 with respect to the housing 200 in the left-right direction (Y-axis direction in the drawings) while guiding the movement of the light guide 100 in the front-rear direction (X-axis direction in the drawings).

The fitting wall 223 is a wall-shaped portion that is located on the front side (positive X-axis side in the drawings) of the guide rib 222, protrudes downward from the wall surface 220A, and extends in the left-right direction (Y-axis direction in the drawings). The fitting wall 223 has a fitting surface 223A (an example of a "second contact surface" recited in the claims) that contacts the front surface (positive X-axis side in the drawings) of the coupling portion 120 of the light guide 100, thereby allowing the light guide 100 to be accurately positioned in the front-rear direction. As illustrated in FIG. 4, FIG. 5, FIG. 7, FIG. 9, and FIG. 10, the fitting surface 223A is formed on the rear side (negative X-axis side) of the fitting wall 223.

Each of the fitting protrusions 224 has a snap-in structure and protrudes downward from the wall surface 220A. The fitting protrusions 224 are provided on the left side and right side (positive Y-axis side and the negative Y-axis side in the drawings) of the guide rib 222. As illustrated in FIG. 6 and FIG. 8, in the assembled state of the light guide 100, the fitting protrusions 224 are engaged with the rear surface (on the negative X-axis side in the drawings) of the coupling portion 120 of the light guide 100, thereby preventing the light guide 100 from moving rearward.

That is, the coupling portion 120 is engaged between the fitting wall 223 and the fitting protrusions 224. Therefore, after the light guide 100 is assembled, the light guide 100 does not move in the front-rear direction.

The coupling portion 120 of the light guide 100 is elastically deformable. Accordingly, when the light guide 100 slides forward, the coupling portion 120 is pressed by the fitting protrusions 224 and is elastically deformed downward, thereby causing the coupling portion 120 to move over the fitting protrusions 224 from the rear side to the front side of the fitting protrusions 224. Further, because the coupling portion 120 is elastically deformable, an impact, positional displacement, and the like that may occur during the assembly of the light guide 100 can be absorbed, and thus, the light guide 100 can be readily assembled.

As illustrated in FIG. 4 through FIG. 8, the housing 200 has the flat-shaped wall surfaces 220B facing the second space 220, namely facing the rear side (negative X-axis side in the drawings). The wall surfaces 220B contact the end surfaces 142A and 144A on the front side (positive X-axis side in the drawings) of the first reinforcing portion 142 and the second reinforcing portion 144, thereby positioning the light guide 100 in the front-rear direction.

Further, as illustrated in FIG. 4 through FIG. 8, the housing 200 has surfaces facing the first space 210, namely facing the upper side (positive Z-axis side in the drawings), positioned higher than the wall surfaces 220B, and formed continuously from the wall surfaces 220B. The above-described surfaces of the housing 200 contact lower surfaces, facing downward, of the first reinforcing portion 142 and the second reinforcing portion 144.

Further, as illustrated in FIG. 5 and FIG. 7, the pair of left and right groove portions 214 and 216 is formed on the lower side (negative Z-axis side in the drawings) of the first space 210. The groove portions 214 and 216 extend in the upper-lower direction (Z-axis direction in the drawings) and have openings on the rear side (negative X-axis side). The groove portions 214 and 216 have sizes such that the first reinforcing portion 142 and the second reinforcing portion 144 of the light guide 100 can be sandwiched in the groove portions 214 and 216, respectively. The edge portions 142C and 144C on the front side (positive X-axis side in the drawings) of the first reinforcing portion 142 and the second reinforcing portion 144 of the light guide 100 are inserted into the groove portions 214 and 216, thereby positioning the light guide 100 in the left-right direction (Y-axis direction in the drawings).

(Process for Attaching Light Guide 100)

When the light guide 100 is attached to the housing 200, first, the light guide 100 is disposed below the second space 220 as illustrated in FIG. 9. Then, as indicated by an arrow A in FIG. 10, the light guide 100 is moved upward until the top surface 120A of the coupling portion 120 of the light guide 100 comes into contact with the wall surface 220A facing the second space 220. At this time, the guide rib 222 provided on the wall surface 220A is fitted into the guide groove 122 of the coupling portion 120, thereby allowing the light guide 100 to be accurately positioned in the left-right direction (Y-axis direction in the drawings).

Next, as indicated by an arrow B in FIG. 11, with the top surface 120A being in contact with the wall surface 220A, the light guide 100 is caused to slide forward along the guide groove 122 until the coupling portion 120 contacts the fitting surface 223A. In this manner, the coupling portion 120 contacts the fitting wall 223 and is engaged between the fitting protrusions 224 and the fitting wall 223. Accordingly, the light guide 100 is accurately positioned in the front-rear direction (X-axis direction in the drawings). In addition, in the assembled state, the light guide 100 does not readily move in the front-rear direction even if a vibration or the like is generated.

Further, the coupling portion 120 is pressed by the fitting protrusions 224 and is elastically deformed, thus allowing the coupling portion 120 to move over the fitting protrusions 224 and to be positioned on the front side of the housing 200 relative to the fitting protrusions 224.

Further, the end surfaces 142A and 144A of the first reinforcing portion 142 and the second reinforcing portion 144 of the light guide 100 are pressed against the wall surfaces 220B facing the second space 220. This also allows the light guide 100 to be positioned in the front-rear direction (X-axis direction in the drawings).

Further, the first reinforcing portion 142 of the light guide 100 is pressed into the groove portion 214, and the second reinforcing portion 144 is pressed into the groove portion 216. At this time, the most protruding points of the ribs 142B contact the surfaces facing the right side and the left side of the groove portion 214. Further, the most protruding points of the ribs 144B contact the surfaces facing the right side and the left side of the groove portion 216. Accordingly, the light guide 100 is positioned with respect to the housing 200 in the left-right direction (Y-axis direction in the drawings).

Further, the edge portions 142C and 144C, on the front side (positive X-axis side in the drawings), of the first reinforcing portion 142 and the second reinforcing portion 144 are inserted into the groove portions 214 and 216 provided on the lower side of the first space 210. Accordingly, the light guide 100 is positioned in the left-right direction (Y-axis direction in the drawings). Further, as indicated by an arrow C in FIG. 12, the substrate 300 is attached below the second space 220. At this time, the first leg portion 132 and the second leg portion 134 of the light guide 100 contact the upper surface of the substrate 300 and are thus pressed upward. Accordingly, as indicated by an arrow D in FIG. 12, the light guide 100 is pressed upward. As a result, the upper side of the top surface 120A of the light guide 100 is in pressure contact with the wall surface 220A. Accordingly, even if a strong vibration is applied to the entire illumination device 10 in the upper-lower direction (Z-axis direction in the drawings), the relative position between the light guide 100, the housing 200, and the substrate 300 will not be displaced.

As described above, in the illumination device 10 according to the present embodiment, the light guide 100 can be accurately positioned in the upper-lower direction (Z-axis direction in the drawings), the left-right direction (Y-axis direction in the drawings), and the front-rear direction (X-axis direction in the drawings) with merely two actions such as bringing the light guide 100 into contact with the wall surface 220A and causing the light guide 100 to slide forward. Accordingly, with a relatively simple configuration, the illumination device 10 according to the present embodiment can readily attach the light guide 100 to a precise position in the housing 200.

As described above, the illumination device 10 according to the present embodiment includes the housing 200 having the opening 212 formed through the housing 200 from the upper side to the lower side of the housing 200. The opening 212 includes the first space 210 and the second space 220. The first space 210 is located closer to the upper side and extends in the Z-axis direction, and the second space 220 is located closer to the lower side relative to the first space 210, is continuous from the first space 210, and extends in the X-axis direction that is orthogonal to the Z-axis direction. Further, the illumination device 10 includes the substrate 300, the LED 302, and the light guide 100. The substrate 300 is disposed closer to the lower side relative to the second space 220. The LED 302 is disposed on the upper surface of the substrate 300 so as to face the second space 220. The light guide 100 is disposed across the first space 210 and the second space 220, and is configured to guide light, emitted from the LED 302, to the opening 212. The housing 200 has the wall surface 220A, the guide rib 222, and the fitting wall 223. The wall surface 220A faces both the lower side of the housing 200 and the second space 220 and contacts the light guide 100, the guide rib 222 extends in the X-axis direction, and the fitting wall 223 extends in the Y-axis direction that is different from the Z-axis direction and the X-axis direction. The light guide 100 has the top surface 120A and the guide groove 122. The top surface 120A contacts the wall surface 220A so as to position the light guide 100 in the Z-axis direction. The guide groove 122 is provided in the top surface 120A, and is fitted to the guide rib 222 so as to position the light guide 100 in the Y-axis direction while guiding the movement of the light guide 100 in the X-axis direction.

Accordingly, in the illumination device 10 according to the present embodiment, the light guide 100 can be accurately positioned in the upper-lower direction, the left-right direction, and the front-rear direction with merely two actions such as bringing the light guide 100 into contact with the wall surface 220A and causing the light guide 100 to slide forward. Accordingly, with a relatively simple configuration, the illumination device 10 according to the present embodiment can readily attach the light guide 100 to a precise position in the housing 200.

Further, in the illumination device 10 according to the present embodiment, the light guide 100 further includes the first leg portion 132 and the second leg portion 134. Each of the first leg portion 132 and the second leg portion 134 extends downward, and receives an upward pressing force from the substrate 300 by making contact with the upper surface of the substrate 300.

Accordingly, in the illumination device 10 according to the present embodiment, the light guide 100 can be pressed upward by the substrate 300 by attaching the substrate 300 at a predetermined position. That is, an upward force is exerted on the light guide 100, thereby causing the light guide 100 to be in pressure contact with the wall surface 220A. Accordingly, even if a strong vibration is applied to the entire illumination device 10 in the upper-lower direction (Z-axis direction in the drawings), any relative positional displacement between the light guide 100, the housing 200, and the substrate 300 can be minimized.

Further, in the illumination device 10 according to the present embodiment, the light guide 100 includes the light guide path 112, the first branch path 114, the second branch path 116, and the coupling portion 120. The light guide path 112 is disposed over the LED 302, and has the light incident surface 100A that receives light emitted from the light source. The first branch path 114 and the second branch path 116 branch from the upper side of the light guide path toward the Y-axis direction, and extend from the second space 220 to the first space 210. The coupling portion 120 is disposed on the upper side of the light guide to couple the first branch path 114 to the second branch path 116. The top surface 120A is provided on the coupling portion 120.

Accordingly, in the illumination device 10 according to the present embodiment, the strength between the first branch path 114 and the second branch path 116 can be enhanced (that is, a displacement can be minimized). In addition, the coupling portion 120 (a portion that is less displaced) between the first branch path 114 and the second branch path 116 can be utilized to position the light guide 100 in the upper-lower direction. Accordingly, with a relatively simple configuration, the illumination device 10 according to the present embodiment can readily attach the light guide 100 to a precise position in the housing 200.

Further, in the illumination device 10 according to the present embodiment, the coupling portion 120 is elastically deformable, and the fitting wall 223 has the fitting surface 223A and the fitting protrusions 224. The fitting surface 223A positions the light guide 100 in the X-axis direction, and the fitting protrusions 224 fix the light guide 100 after the light guide is positioned in the X-axis direction by causing the coupling portion 120 to be elastically deformed such that the coupling portion 120 engages with the fitting protrusions 224.

Accordingly, in the illumination device 10 according to the present embodiment, with the top surface 120A being in contact with the wall surface 220A (that is, with the light guide 100 being positioned in the upper-lower direction), the light guide 100 is caused to slide forward such that the coupling portion 120 engages with the fitting protrusions 224. Accordingly, with a relatively simple configuration, the illumination device 10 according to the present embodiment can readily attach the light guide 100 to a precise location in the housing 200.

Further, in the illumination device 10 according to the present embodiment, the first branch path 114 and the second branch path 116 have the respective curved portions 113 that are positioned higher than the branch position, and the coupling portion 120 couples the inner peripheral surface of the curved portion 113 of the first branch path 114 to the inner peripheral surface of the curved portion 113 of the second branch path 116.

Accordingly, in the illumination device 10 according to the present embodiment, in the first branch path 114 and the second branch path 116, the coupling portion 120 can be coupled to portions having a low density of guided light. Therefore, leakage of light to the coupling portion 120 can be reduced.

Further, in the illumination device 10 according to the present embodiment, the light guide 100 further includes the first reinforcing portion 142 that couples the left side surface 112A on the first branch path 114 side of the light guide path 112 to the lower surface of the first branch path 114, and the second reinforcing portion 144 that couples the right side surface 112B on the second branch path 116 side of the light guide path 112 to the lower surface of the second branch path 116. The first reinforcing portion 142 and the second reinforcing portion 144 have the respective end surfaces 142A and 144A that position the light guide in the X-axis direction by contacting the wall surfaces 220B that face the second space 220.

Accordingly, in the illumination device 10 according to the present embodiment, the light guide 100 can be accurately positioned in the front-rear direction by causing the light guide 100 to slide forward and bringing the first reinforcing portion 142 and the second reinforcing portion 144 into contact with the wall surfaces 220B that face the second space 220. Accordingly, with a relatively simple configuration, the illumination device 10 according to the present embodiment can readily attach the light guide 100 to a precise location in the housing 200.

Although the embodiment of the present invention has been specifically described above, the present invention is not limited to the specific embodiment, and various modifications and variations may be made without departing from the scope of the present invention.

For example, in the above-described embodiment, an example in which the present invention is applied to the illumination device 10 has been described. However, the present invention is not limited thereto, and may be applied to any illumination device that has a configuration in which light, from a light source provided on a substrate, enters a light guide and is emitted through an opening of a housing.

What is claimed is:

1. An illumination device comprising:
 a housing having an opening that extends through the housing from a first side to a second side of the housing;
 a substrate;
 a light source configured to emit light; and
 a light guide,
 wherein the opening includes a first space and a second space, the first space being located closer to the first side and extending in a first direction, and the second space being located closer to the second side relative to the first space, being continuous from the first space, and extending in a second direction that is orthogonal to the first direction,
 the substrate is disposed closer to the second side relative to the second space,
 the light source is disposed on one surface of the substrate so as to face the second space, the light guide is disposed across the first space and the second space, and is configured to guide the light, emitted from the light source, to the opening, the housing has
- a wall surface that faces both the second side and the second space and contacts the light guide,
- a guide rib that extends in the second direction, and
- a fitting wall that extends in a third direction, the third direction being different from the first direction and the second direction, and the light guide has
- a first contact surface that contacts the wall surface so as to position the light guide in the first direction, and
- a guide groove that is provided in the first contact surface and is fitted to the guide rib so as to position the light guide in the third direction while guiding movement of the light guide in the second direction.

2. The illumination device according to claim 1, wherein the light guide further includes a leg portion that extends toward the second side, and receives, from the substrate, a pressing force in a direction toward the first side by making contact with the one surface of the substrate.

3. The illumination device according to claim 1, wherein the light guide further includes
- a light guide path disposed facing the light source, and having a light incident surface that receives the light emitted from the light source,
- a first branch path and a second branch path, the first branch path and the second branch path branching from one side of the light guide path toward the third direction, and extending from the second space to the first space, and
- a coupling portion disposed on one side of the light guide to couple the first branch path to the second branch path, wherein the first contact surface is provided on the coupling portion.

4. The illumination device according to claim 3, wherein the coupling portion is elastically deformable, and
the fitting wall has a second contact surface that positions the light guide in the second direction, and a fitting protrusion that fixes the light guide after the light guide is positioned in the second direction by causing the coupling portion to be elastically deformed such that the coupling portion engages with the fitting protrusion.

5. The illumination device according to claim 3, wherein the first branch path and the second branch path have respective curved portions that are positioned closer to the first side relative to a branch position, and
the coupling portion couples an inner peripheral surface of the curved portion of the first branch path to an inner peripheral surface of the curved portion of the second branch path.

6. The illumination device according to claim 3, wherein the light guide further includes a first reinforcing portion that couples a side surface on a first branch path side of the light guide path to a lower surface of the first branch path, and a second reinforcing portion that couples a side surface on a second branch path side of the light guide path to a lower surface of the second branch path, and
wherein each of the first reinforcing portion and the second reinforcing portion has a third contact surface that positions the light guide in the second direction by contacting a positioning portion that faces the second space.

* * * * *